(12) United States Patent
Sakanushi et al.

(10) Patent No.: US 6,850,165 B2
(45) Date of Patent: Feb. 1, 2005

(54) CATALYST DETERIORATION DETECTING SYSTEM FOR AN AUTOMOBILE

(75) Inventors: Masahiro Sakanushi, Wako (JP); Yoshiaki Matsuzono, Wako (JP); Hiroshi Oono, Wako (JP); Hideki Uedahra, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/101,602

(22) Filed: Mar. 21, 2002

(65) Prior Publication Data

US 2002/0139109 A1 Oct. 3, 2002

(30) Foreign Application Priority Data

Mar. 28, 2001 (JP) ........................................ 2001-092521

(51) Int. Cl.[7] .............................................. G08B 17/10
(52) U.S. Cl. ..................... 340/633; 73/118.1; 60/274; 60/276; 60/277; 60/278; 60/299; 60/302
(58) Field of Search ................................. 340/633, 439, 340/438, 449; 73/118.1, 118.2, 23.31, 23.32; 701/101, 109; 60/278, 286, 287, 299, 302, 277, 276, 274, 284; 123/325, 326

(56) References Cited

U.S. PATENT DOCUMENTS

| | | | | |
|---|---|---|---|---|
| 4,177,787 A | * | 12/1979 | Hatori et al. ............ 123/198 D |
| 5,170,147 A | * | 12/1992 | Graffagno et al. .......... 340/449 |
| 5,408,215 A | * | 4/1995 | Hamburg ................... 340/439 |
| 5,847,271 A | * | 12/1998 | Poublon et al. ............ 73/118.1 |
| 5,948,974 A | * | 9/1999 | Mitsutani .................. 73/118.1 |
| 5,966,930 A | * | 10/1999 | Hatano et al. ................ 60/276 |
| 6,047,544 A | * | 4/2000 | Yamamoto et al. ........... 60/285 |
| 6,463,735 B2 | * | 10/2002 | Morinaga et al. ............. 60/277 |

FOREIGN PATENT DOCUMENTS

| | | |
|---|---|---|
| JP | A-2-117890 | 5/1990 |
| JP | A-5-106494 | 4/1993 |
| JP | A-10-61427 | 3/1998 |
| JP | B2-3076417 | 6/2000 |

* cited by examiner

*Primary Examiner*—Davetta W. Goins
(74) *Attorney, Agent, or Firm*—Arent Fox PLLC

(57) ABSTRACT

The invention provides a catalyst deterioration detecting system that is capable of detecting the degree of deterioration of each catalyst in a catalyst converter which includes two or more catalysts in series.

The catalyst deterioration detecting system of an internal-combustion engine according to the invention is provided with a upstream catalyst located on an upstream side of an exhaust system of the internal-combustion engine and a downstream catalyst located on a downstream side of the exhaust system. The device comprises an oxygen density detector which is disposed downstream of the downstream catalyst and a deterioration detector for detecting a deterioration degree of the upstream catalyst based on the output of the oxygen density detector. According to an aspect of the invention, the deterioration detector detects deterioration degree of the downstream catalyst based on the previously detected deterioration degree of the upstream catalyst.

14 Claims, 8 Drawing Sheets

CATALYST DETERIORATION DETECTING SYSTEM FOR AN AUTOMOBILE

BACKGROUND OF THE INVENTION

The invention relates to a catalyst deterioration detecting system for determining deterioration of catalysts located in an exhaust system of an internal-combustion engine, and more particularly, it relates to a system for detecting the degree of deterioration of respective catalysts in a catalyst converter that includes an upstream catalyst located immediately below the engine in the upstream side of the exhaust system and a downstream catalyst or a downstream catalyst located on the downstream side in the exhaust system.

In general, a three-way catalyst remains inactive until its temperature is raised by exhaust gas after the engine has started. Therefore, purification of the exhaust gas is not sufficiently performed immediately after the engine start.

As one of the conventional techniques for accelerating the purification of the exhaust gas just after the engine start, there is a known catalyst converter that disposes an upstream catalyst relatively near the engine in addition to a downstream catalyst. In such a catalyst converter that is provided with two catalysts in series, the temperature of the upstream catalyst rises more quickly as heated by the exhaust gas just after the engine start than that of the downstream catalyst. Accordingly, this type of catalyst converter can start the purification of the exhaust gas more quickly than another type of a converter that is provided with a downstream catalyst only.

As for the catalyst converter which has two catalysts in series, the upstream catalyst located on the upstream side generally deteriorates faster than the downstream catalyst located on the downstream side. However, thermal load of the downstream catalyst on the downstream side occasionally increases depending on the operational conditions, so that deterioration of the downstream catalyst on the downstream side may progress more quickly than the upstream catalyst.

A prior art for determining deterioration of each catalyst in the catalyst converter having two catalysts in series is described in Japanese Patent No. 3076417. The catalyst converter comprises a first O2 sensor disposed upstream of the upstream catalyst, a second O2 sensor disposed between the upstream and the downstream catalysts, and a third O2 sensor disposed downstream of the downstream catalyst. Deterioration of each catalyst is determined based on the outputs from these three O2 sensors.

Other conventional methods for determining catalyst deterioration in a single-catalyst converter are described in Patent Application Unexamined Publication (Kokai) No. H2-117890, Kokai No. H5-106494 and Kokai No. H10-61427.

The method disclosed in Kokai No. H2-117890 first performs switching of the fuel correction coefficient at a constant frequency and then calculates integrals or areas in the graphs of the output of the upstream O2 sensor and the downstream O2 sensor to determine the difference of the areas. Deterioration of the catalyst is determined based on the areal difference.

The method disclosed in Kokai No. H5-106494 performs a feedback control of the air-fuel ratio of air-fuel mixture to be supplied to the engine depending on the output of the O2 sensor located on the downstream side of the catalyst disposed in the exhaust pipe. The method uses reversal cycle of the output of the O2 sensor during the feedback control to determine deterioration of the catalyst.

The method disclosed in Kokai No. H10-61427 performs a feedback control of the air-fuel ratio based on the output of the O2 sensor located on the downstream side of the catalyst. The method estimates the oxygen storage capacity of the catalyst based on reversal of the output of the downstream-side O2 sensor and accumulation value of intake airflow. Deterioration of the catalyst is determined based on the estimated oxygen storage capacity.

As shown in the above-referenced Japanese Patent No. 3076417, in order to determine deterioration of the catalysts in the catalyst converter, which includes two or more catalysts in series, a plurality of sensors are provided between each pair of the catalysts disposed in series. This structure incurs extra cost due to increase of the number of the sensors and has a drawback that the control scheme becomes complicated.

If sensors are positioned only on the most upstream and downstream sides of the multiple catalysts in order to resolve the above-stated drawback, only overall deterioration of the multiple catalysts is determined.

Because each catalyst in such a structure having two or more catalysts deteriorates separately depending on the operational conditions as described above, it is desired that deterioration be separately determined for each catalyst.

Therefore, there is a need for a catalyst deterioration detecting system that is capable of separately detecting deterioration of each catalyst utilizing sensors located only on the uppermost stream side and the lowermost stream side in a catalyst converter which includes two or more catalysts in series.

SUMMARY OF THE INVENTION

According to one aspect of the invention, a catalyst deterioration detecting system for an internal-combustion engine is provided with an upstream catalyst located on an upstream side of an exhaust system of the internal-combustion engine for purifying exhaust gas and a downstream catalyst located on a downstream side of the exhaust system for purifying the exhaust gas. The catalyst deterioration detecting system comprises an oxygen density detector which is disposed downstream of the downstream catalyst and a deterioration detector for detecting the degree of deterioration of the upstream catalyst based on the output of the oxygen density detector.

According to the invention, the catalyst deterioration detecting system can detect the degree of deterioration of the upstream catalyst using only the oxygen density detector disposed downstream of the downstream catalyst.

In one embodiment of the invention, the deterioration detector is configured to detect the degree of deterioration of the downstream catalyst based on the degree of deterioration of the upstream catalyst.

The catalyst deterioration detecting system can detect the degree of deterioration of the downstream catalyst using only the oxygen density detector disposed downstream of the downstream catalyst.

In another aspect of the invention, the catalyst deterioration detecting system further comprises an activation detector for detecting whether or not each of the upstream and the downstream catalysts is active. The catalyst deterioration detecting system can detect whether or not each of the downstream and upstream catalysts is active.

In a further aspect of the invention, the activation detector of the catalyst deterioration detecting system is configured to determine activation of each catalyst based on respective temperatures of the upstream and downstream catalysts. The catalyst deterioration detecting system can accurately determine activation of catalysts based on the temperature of each catalyst.

In yet another aspect, the invention provides a catalyst deterioration detecting system for an internal-combustion engine for determining deterioration of catalysts in a catalyst converter having an upstream catalyst located on the upstream side of an exhaust system and a downstream catalyst located on a downstream side of the exhaust system. The catalyst deterioration detecting system comprises an oxygen density detector disposed downstream of the downstream catalyst, and an air-fuel ratio controller for performing feedback control of the air-fuel ratio of air-fuel mixture to be supplied to the engine based on the output of the oxygen density detector. The system also includes an activation detector for detecting whether or not each of the upstream and the downstream catalysts is active and deterioration detector for detecting overall deterioration degree of the upstream and the downstream catalysts based on the output of the oxygen density detector. The deterioration detector detects the degree of deterioration of the upstream catalyst based on the output of the oxygen density detector when the activation detector detects that the upstream catalyst is active and the downstream catalyst is not active.

According to this aspect of the invention, the catalyst deterioration detecting system can determine a status where only the upstream catalyst is working as a catalyst, so that the system can avoid the influence from the downstream catalyst and can accurately detect the degree of deterioration of the upstream catalyst.

In a further aspect of the invention, the catalyst deterioration detecting system is configured such that the deterioration detector detects the degree of deterioration of the downstream catalyst based on the previously detected deterioration degree of the upstream catalyst when the activation detector detects the status where both upstream and downstream catalysts are activated.

According to this aspect, the catalyst deterioration detecting system can determine the status when both upstream and downstream catalysts are activated and can detect the degree of deterioration of the downstream catalyst taking into consideration of the previously detected deterioration of the upstream catalyst.

In a further aspect of the invention, the activation detector of the catalyst deterioration detecting system is configured to determine activation of each catalyst based on respective temperatures of the upstream and the downstream catalysts. Activation of each catalyst can be determined based on the respective temperatures of the upstream and the downstream catalysts. Activation of the catalyst depends on its temperature.

DESCRIPTION OF THE PREFERRED EMBODIMENTS

Figure 1:
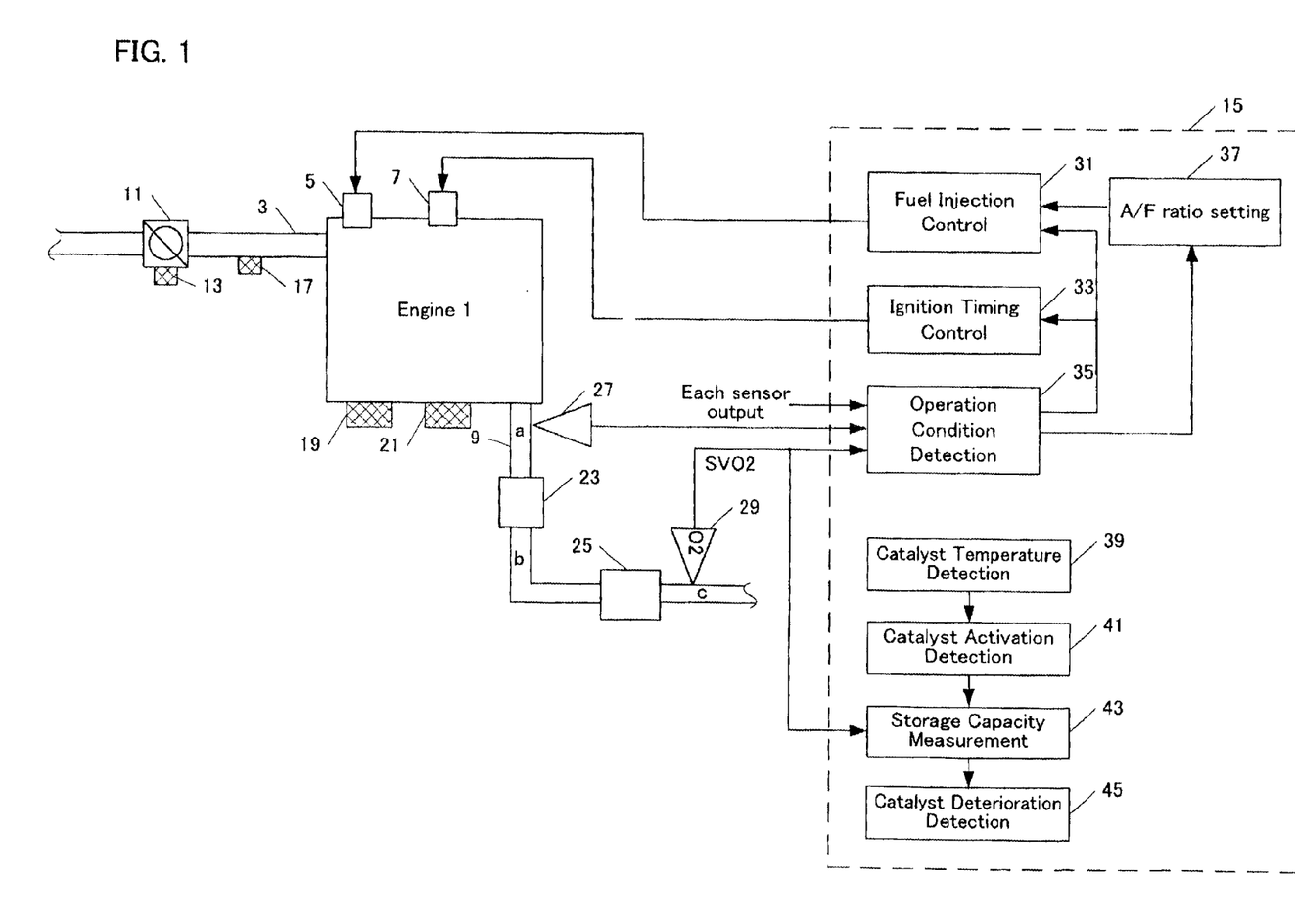
FIG. 1 shows a block diagram of the engine according to an embodiment of the invention.

Referring to the accompanying drawings, a preferred embodiment of the invention will be described. FIG. 1 illustrates a block diagram of the engine 1 and a control unit for the engine 1. The engine 1 includes an intake duct or manifold 3, a fuel injector 5, a spark plug 7 and an exhaust pipe 9.

The intake manifold 3 is provided with a throttle valve 11 connected to a throttle valve open degree ($\theta$ TH) sensor 13. The sensor 13 outputs an electric signal corresponding to the open degree of the throttle valve 11 and provides its output to an electronic control unit (will be referred to as "ECU" hereinafter) 15. Furthermore, the intake manifold 3 is provided with an intake manifold internal pressure sensor 17 for detecting the pressure inside the intake manifold.

The engine 1 is provided with an engine revolution speed (Ne) sensor 21 for detecting the revolution speed of the engine 1. This sensor provides an output pulse to ECU every time crankshaft of the engine 1 rotates 180 degrees. This pulse signal is referred to as a TDC signal hereinafter.

The engine 1 has various kinds of sensors in addition to the engine revolution speed sensor 21. Outputs of these various sensors are respectively used by the ECU 15 to detect conditions of the engine operation. An example of those sensors is an engine water temperature (TW) sensor that detects the engine water temperature (cooling water temperature). In this embodiment, those various types of sensors are generically referred to as a sensor 19.

In the exhaust pipe 9, two three-way catalysts 23, 25 are provided for purifying the exhaust gas. In this specification, the catalyst 23 that is disposed on the upstream side of the exhaust pipe 9 is referred to as "upstream catalyst" and the catalyst 25 that is disposed on the downstream side of the exhaust pipe 9 is referred to as "downstream catalyst".

The upstream catalyst 23 is disposed relatively near the engine so that it may be quickly warmed by exhaust gas immediately after starting the engine whereas the downstream catalyst is disposed relatively far from the upstream catalyst 23 and on the downstream side of the exhaust pipe 9. Since the catalysts are thus separately positioned at two positions, the upstream and the downstream in the exhaust system of the engine, the exhaust purification performance at lower temperature is improved.

An upstream air-fuel ratio sensor 27 is disposed between the engine 1 and the upstream catalyst 23 in the exhaust pipe 9. The sensor 27 detects the air-fuel ratio of the exhaust gas discharged from the engine 1. Depending on the type of the engine 1, the sensor 27 may be a linear air-fuel ratio sensor that detects the full range of air-fuel ratio. The sensor 27 may be an O2 type sensor that changes the output level like an on/off switch at the theoretical air-fuel ratio value. The signal detected by the sensor 27 is sent to the ECU 15 to be used for controlling the air-fuel ratio of the engine 1.

An O2 sensor 29 is disposed downstream of the downstream catalyst 23 in the exhaust pipe 9. The sensor 29 detects the oxygen density of the exhaust gas that has passed through both of the upstream catalyst 23 and the downstream catalyst 25. The oxygen density detection signal by the O2 sensor 29 is referred to as "SVO2" in the following description of this specification.

The ECU 15, which is constructed with a computer, includes a ROM (read only memory) for storing programs and data. It also includes a RAM (random access memory) that provides an operational workspace to store/retrieve programs and data required in runtime. It further includes a CPU executing programs, a circuit for processing input signals from various sensors, and an output circuit for sending control signals to respective units of the engine.

All outputs from the aforementioned various sensors are input to the ECU 15 for processing in accordance with the programs included in the ECU 15. With such a hardware structure, ECU 15 is shown in terms of functional blocks in FIG. 1.

The ECU 15 shown in FIG. 1 comprises a fuel injection controller 31, an ignition-timing controller 33, an operational condition detector 35 and an air-fuel ratio setting unit 37. The operational condition detector 35 determines conditions of the engine operation based on the outputs from various sensors. Based on the conditions of the engine operation detected by the detector 35, the ignition-timing controller 33 sends a signal for controlling the ignition timing so as to control ignition of the spark plug 7. The air-fuel ratio setting unit 37 receives information on the operational condition from the detector 35 to set a target air-fuel ratio. The fuel injection controller 31 calculates the fuel injection timing based on the condition of the engine operation sent from the detector 35 so as to control the fuel injector 5.

ECU 15 determines conditions of the engine operation based on the aforementioned various engine parameters so as to make a feedback control of the air-fuel ratio depending on the determined conditions of the engine operation.

In order to determine deterioration of the upstream catalyst 23 and the downstream catalyst 25, ECU 15 includes a catalyst temperature detector 39, a catalyst activation detector 41, a storage capacity measuring unit 43 and a catalyst deterioration detector 45. The catalyst temperature detector 39 detects respective temperatures of the upstream catalyst 23 and the downstream catalyst 25. The catalyst activation detector 41 detects whether or not each catalyst is active based on the temperature of each catalyst detected by the catalyst temperature detector 39. The storage capacity measuring unit 43 measures oxygen storage capacity of the upstream catalyst 23 or the downstream catalyst 25 according to the activation state of each catalyst detected by the catalyst activation detector 41.

More specifically, when the catalyst activation detector 41 determines that the upstream catalyst 23 is active and that the downstream catalyst 25 is not activated, the storage capacity measuring unit 43 measures the oxygen storage capacity of the upstream catalyst 23. When the catalyst activation detector 41 determines that both of the upstream catalyst 23 and the downstream catalyst 25 are activated, the storage capacity measuring unit 43 measures the oxygen storage capacity of the downstream catalyst 25. The catalyst deterioration detector 45 detects the deterioration of each catalyst based on the oxygen storage capacity of each catalyst that has been measured by the storage capacity measuring unit 43. Details of the catalyst deterioration detection in accordance with one embodiment of the invention will now be described.

A catalyst deterioration detecting system according to one embodiment of the invention is capable of separately detecting the degree of deterioration of each of the three-way catalysts (the upstream catalyst 23 and the downstream catalyst 25) that are disposed separately in series. This is achieved by means of determining whether each catalyst is active and measuring the degree of deterioration of each catalyst based on such activation determination.

As for three-way catalysts, the activation temperature that is the temperature above which catalytic reaction takes place, is generally higher than the air temperature. Accordingly, the catalyst remains in an inactive state until the engine starts and the temperature rises as it is heated by exhaust gas.

In order to accelerate purification of the exhaust gas immediately after the engine has started, the upstream catalyst 23 is disposed relatively near the engine in the exhaust pipe 9 as shown in FIG. 1. According to such structure for the catalysts, the temperature of the exhaust gas that flows through the downstream catalyst 25 is lowered while the exhaust gas passes through the exhaust pipe 9. The temperature of the exhaust gas flowing through the upstream catalyst is relatively high because the upstream catalyst is located near the engine. Therefore, the temperature of the upstream catalyst 23 rises more quickly heated by the exhaust gas just after the engine starts. Accordingly, the upstream catalyst 23 quickly starts purification of the exhaust gas in contrast to the downstream catalyst 25.

Figure 2:
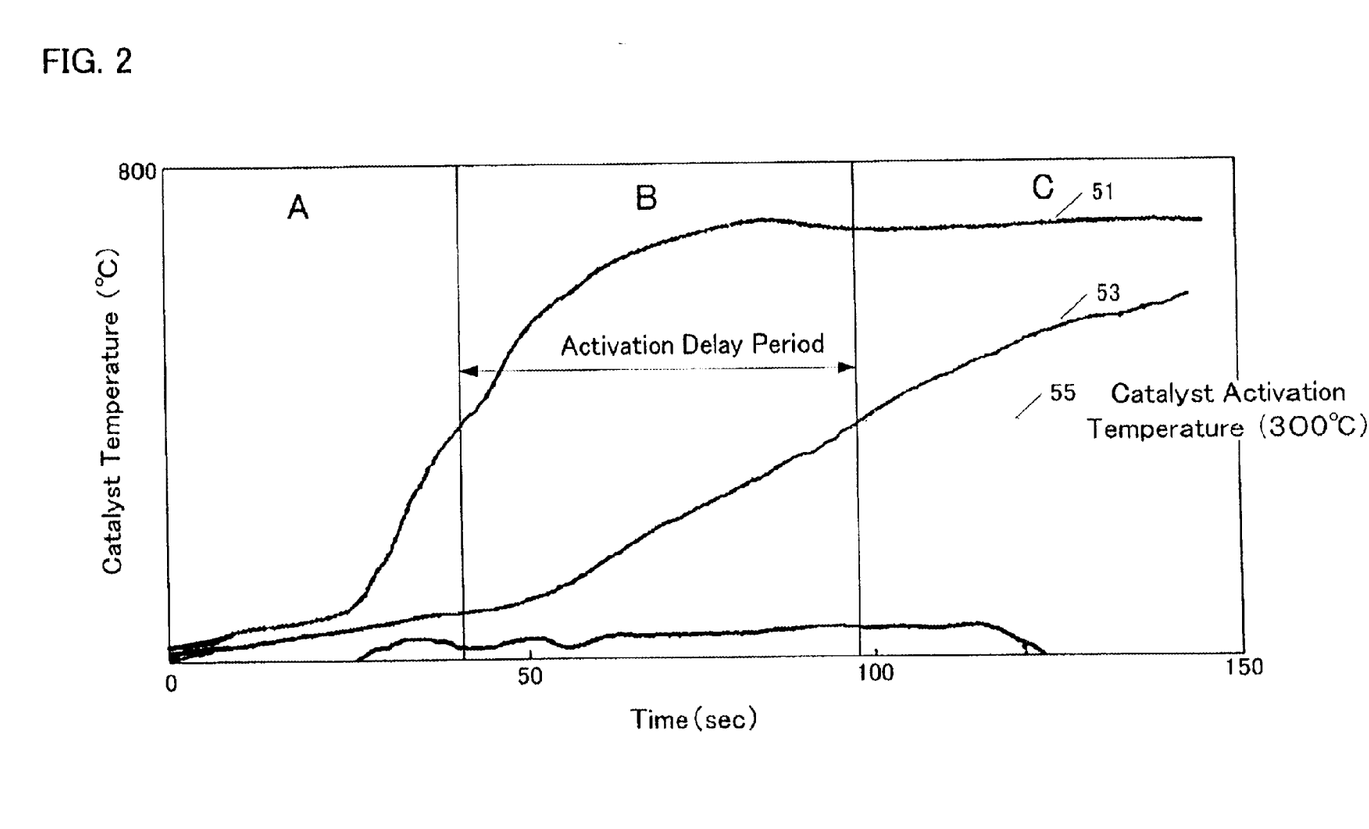
FIG. 2 is a graph showing behavior of the temperature of the upstream and the downstream catalysts immediately after the engine start.

FIG. 2 shows the respective temperature behavior of the upstream catalyst 23 and the downstream catalyst 25 immediately after the engine starts. A curve 51 shows behavior of the temperature of the upstream catalyst 23 immediately after the engine start, and a curve 53 shows behavior of the temperature of the downstream catalyst 25 immediately after the engine start. A dashed line 55 in FIG. 2 shows a catalytic activation temperature above which catalysts work. Each of the upstream catalyst 23 and the downstream catalyst 25 acts as a catalyst at temperatures exceeding the catalytic activation temperature.

As seen in FIG. 2, the temperatures of both downstream and upstream catalysts 23, 25 are almost equal when the engine starts. The difference of temperatures grows larger as the time elapses. This is because, as aforementioned, the temperature of the upstream catalyst 23 rises more quickly as heated by the exhaust gas just after the engine starts, reaching the catalytic activation temperature more quickly than the downstream catalyst 25.

Since the downstream catalyst 23 is disposed farther from the engine 1 in comparison to the upstream catalyst 25, the downstream catalyst 23 reaches the catalytic activity temperature with a certain time delay after the upstream catalyst 23 has reached the catalytic activity temperature. The time period from the time the upstream catalyst 23 has reached the catalytic activity temperature to the time the downstream catalyst 25 reaches the catalytic activity temperature will be referred to as "activation delay period" in this specification.

Before the upstream catalyst 23 reaches the catalytic activity temperature after the engine has started, the exhaust gas may not be purified sufficiently by either of these two catalysts. However, during the activation delay period after the upstream catalyst 23 has reached the catalytic activity temperature, the exhaust gas can be purified by the upstream catalyst 23 that has been activated. Furthermore, after the downstream catalyst 25 has reached the catalytic activity temperature through the activation delay period, both of the upstream catalyst 23 and the downstream catalyst 25 purify the exhaust gas.

The catalyst deterioration detecting system according to one embodiment of the invention utilizes the time lag, the activation delay period for separately detecting the degree of deterioration of the upstream catalyst 23 and the downstream catalyst 25.

More specifically, during the activation delay period, the oxygen density of the exhaust gas in the middle portion b of the exhaust pipe 9 shown in FIG. 1 is equal to the oxygen density of the exhaust gas in the downstream portion c of the exhaust pipe 9 because only the upstream catalyst 23 is working as a catalyst, and the downstream catalyst 25 is not working. Accordingly, during the activation delay period, the oxygen density of the exhaust gas that has passed through the upstream catalyst 23 is detected by the downstream O2 sensor 29 without being affected by the downstream catalyst 25. Thus, during the activation delay period, the degree of deterioration of the upstream catalyst 23 can be detected based on the output of the downstream O2 sensor 29.

The degree of deterioration of the downstream catalyst 25 is detected after the degree of deterioration for the upstream catalyst 23 has been obtained and when both of the upstream catalyst 23 and the downstream catalyst 25 have been activated. The oxygen density detected by the downstream O2 sensor 29 after both catalysts have been activated reflects an overall oxygen density that is influenced by both catalysts. Therefore, an overall deterioration for both catalysts can be detected based on this oxygen density. The degree of deterioration of the downstream catalyst 25 can be determined by correcting the degree of overall deterioration based on the degree of deterioration of the upstream catalyst 23.

Although the degree of deterioration of three-way catalysts is detected based on the oxygen storage capacity in this embodiment, any other characteristics of three-way catalysts may be used for detecting the degree of deterioration of catalysts.

An embodiment of a process for the catalyst deterioration determination will now be described. In the embodiment, the oxygen storage capacity is used as a base for determining deterioration of the catalyst at issue. Generally, the oxygen storage capacity of the three-way catalyst decreases in accordance with deterioration of the catalyst. Thus, when a value of the measured oxygen storage capacity is lower than a predetermined reference value, it can be determined that the measured three-way catalyst is deteriorated.

In the embodiment, a value of the reversal period of the downstream O2 sensor 29 during the feedback control of the air-fuel ratio through the downstream O2 sensor 29 shown in FIG. 1 is used as a parameter for indicating oxygen storage capacity. When a catalyst is normal, the oxygen density of the exhaust gas will decrease as oxygen in the exhaust gas is trapped or captured by the catalyst when is passes through the catalyst. Accordingly, the period at the end of which the output of the downstream O2 sensor 29 reverses may be longer when the catalyst is normal than when no catalyst exists or when the catalyst is deteriorated.

On the other hand, when a catalyst is deteriorated, oxygen storage capacity of the catalyst will decrease and oxygen in the exhaust gas is not trapped sufficiently by the catalyst. Accordingly, the period at the end of which the output of the downstream O2 sensor 29 reverses is shorter than when the catalyst is normal. Thus, reversal periods of the downstream O2 sensor 29 vary in response to oxygen storage capacity of the catalyst. The catalyst deterioration detecting system according to one embodiment of the invention can precisely detect the degree of deterioration of catalysts by means of using this reversal period as a parameter indicating the oxygen storage capacity of the catalysts.

The oxygen storage capacity measured during the activation delay period is used for detecting the degree of deterioration of the upstream catalyst. The oxygen storage capacity measured after the activation delay period is used for detecting the degree of deterioration of the downstream catalyst.

Figure 3:
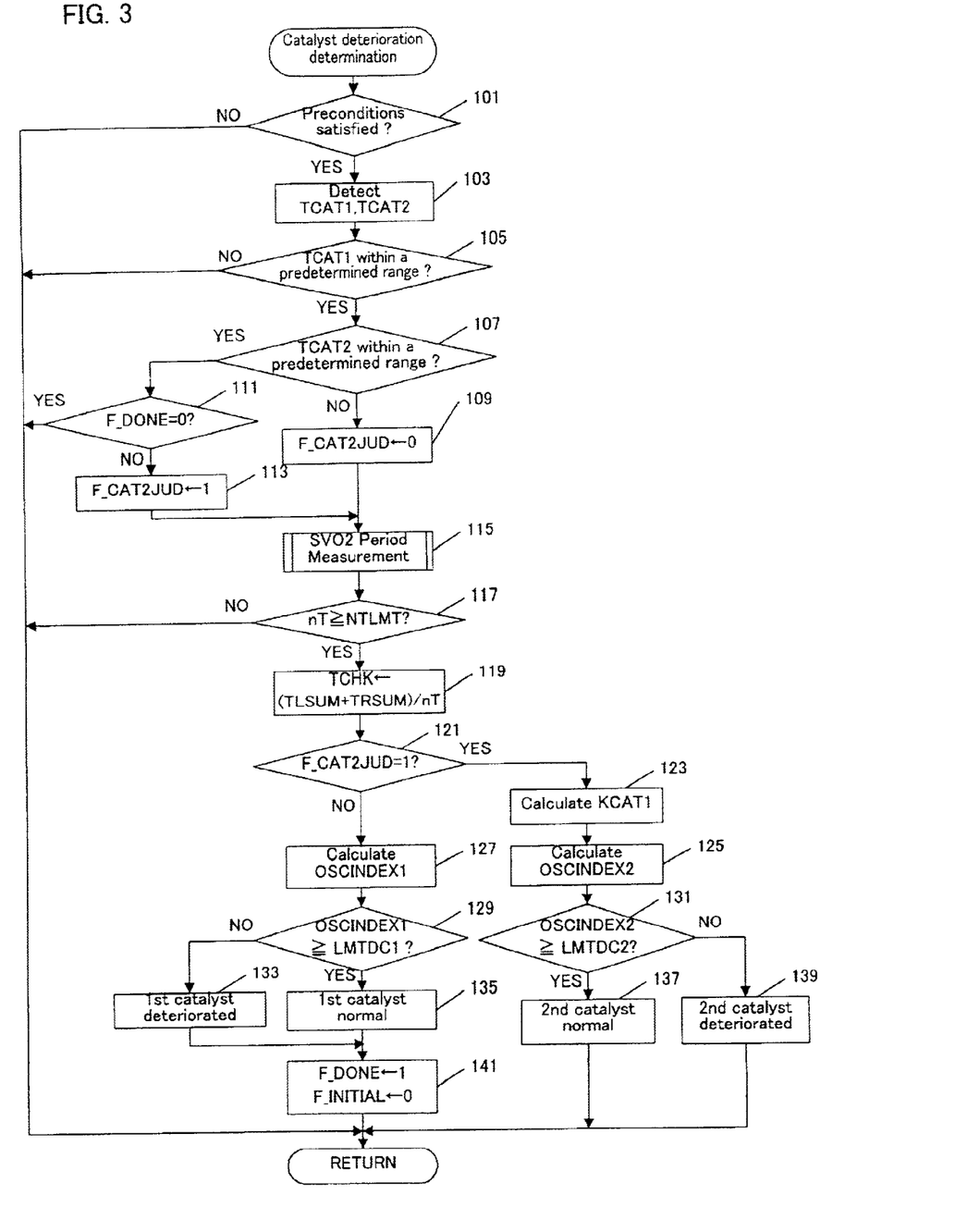
FIG. 3 is a flowchart showing the overall process of the catalyst deterioration determination.

FIG. 3 illustrates a flowchart of an overall process of the catalyst deterioration determination. This process for determining the catalyst deterioration is carried out by ECU 15 at a predetermined interval, for example, every 10 ms.

In step 101, it is determined whether or not preconditions for carrying out the deterioration determination are satisfied. For example, when a certain process is being performed for other components, such deterioration determination process should not be carried out. Therefore, in this situation, it is determined in step 101 that the precondition for the deterioration determination process is not satisfied. Such processes for other components include monitoring of oxygen sensor deterioration, monitoring of malfunction in an evaporating fuel discharge inhibiting system and monitoring of malfunction in fuel systems.

Furthermore, when the condition of the engine operation is decided to be inappropriate for the catalyst deterioration determination based on the outputs from various sensors, it is determined that the precondition is not satisfied. For example, when the condition of the operation is such that the purge of the evaporating fuel from the canister to the intake manifold 3 should be cut, or when the air-fuel ratio correction coefficient KO2 is being kept at a predetermined upper limit value or a predetermined lower limit value for more than a predetermined time, it is determined that the precondition is not satisfied. Besides, when such values of the air intake temperature, the engine water temperature, the engine revolving speed and the vehicle speed which have been obtained from each of the sensors are not within a respective predetermined range for performing the catalyst deterioration determination, it is determined that the precondition is not satisfied. Variation of the vehicle speed V in a given time and variation of absolute pressure PBA inside the intake manifold in a given time are also included in such values that should be examined in step 101.

These preconditions are prerequisite for carrying out an accurate determination of catalyst deterioration. Unless all these preconditions are satisfied, the process will not proceed to the next step. When it is determined in step 101 that all the preconditions are satisfied, the process of the catalyst deterioration determination goes to step 103.

In step 103, a temperature TCAT1 of the upstream catalyst 23 and a temperature TCAT2 of the downstream catalyst 25 are detected. The temperatures of the catalysts may be detected using the outputs from the sensors which are respectively attached to each catalyst, or they may be calculated based on the operational conditions of the engine as will be described in detail.

It is determined in step 105 whether the temperature TCAT1 of the upstream catalyst 23 is within a predetermined range, which is, for example, a range of about 300 to 800 degree C. in terms of the catalyst activation temperature. Based on this range, it is determined in step 105 whether the upstream catalyst 23 is active or not.

When the temperature TCAT1 of the upstream catalyst 23 is not within the predetermined range in step 105, the process of the catalyst deterioration determination ends because the upstream catalyst 23 is not active (it is in the region A in FIG. 2). When the temperature TCAT1 of the upstream catalyst 23 is within the predetermined range in step 105, the process of the catalyst deterioration determination goes to the next step because the upstream catalyst 23 is active (it is in the region B in FIG. 2).

In step 107, it is determined whether the temperature TCAT2 of the downstream catalyst 25 is within a predetermined range, which is again a range of about 300 to 800 degree C. in terms of the catalyst activation temperature. Based on this range, it is determined in step 107 whether the downstream catalyst 25 is active or not.

When the temperature TCAT2 of the downstream catalyst 23 is not within the predetermined range in step 107, the downstream catalyst 23 is inactive and only the upstream catalyst 23 is active as it has been already determined in step 105 (this is represented by the region B in FIG. 2). When the temperature TCAT2 of the downstream catalyst 25 is within the predetermined range, both the upstream catalyst 23 and the downstream catalyst 25 are active (this is represented by the region C in FIG. 2).

When it is determined based on the temperature determination in step 107 that the downstream catalyst 23 is inactive and only the upstream catalyst 23 is active, the process of the catalyst deterioration determination goes to step 109 to carry out the deterioration determination for the upstream catalyst 23. When it is determined based on the temperature determination in step 107 that both the upstream catalyst 23 and the downstream catalyst 25 are active, the process of the catalyst deterioration determination goes to step 111 to carry out the deterioration determination for the downstream catalyst 25.

Description follows about a process going to step 109 to perform the deterioration determination for the upstream catalyst 23 after it is determined in step 107 that only the upstream catalyst 23 is active.

In this case, a catalyst identification flag F_CAT2JUD is set to 0 (zero) in step 109. This flag F_CAT2JUD is used to indicate on which catalyst the current catalyst deterioration determination process is being performed. When F_CAT2JUD=0, the deterioration determination is being performed upon the upstream catalyst 23. When F_CAT2JUD=1, the deterioration determination is being performed upon the downstream catalyst 25.

Figure 4:
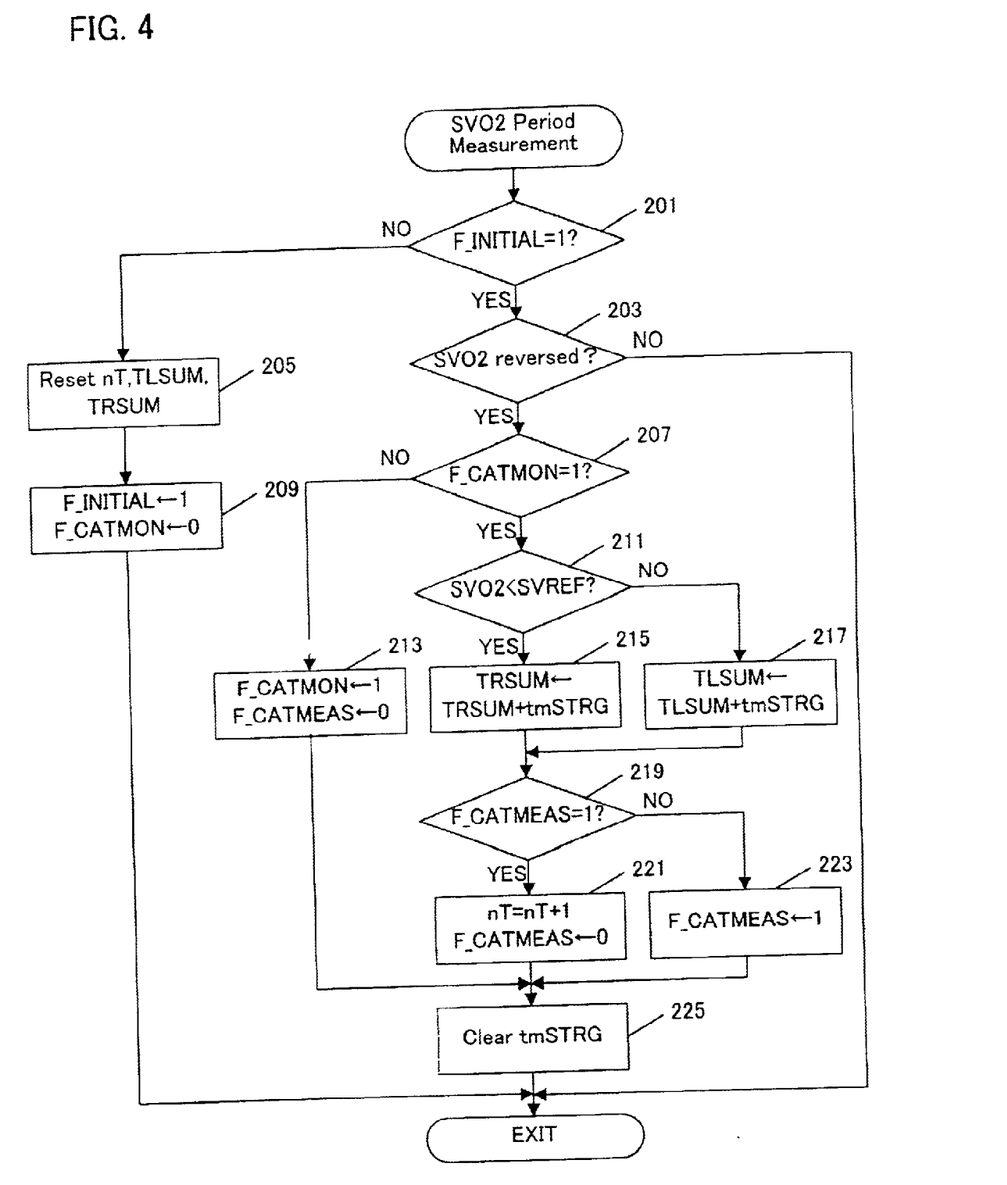
FIG. 4 is a flowchart showing a process for measuring reversal periods.

Subsequently, in step 115, the reversal period of the downstream O2 sensor 29 is measured. FIG. 4 illustrates a flowchart of a process for measuring this reversal period. In order to determine the catalyst deterioration, an air-fuel ratio correction coefficient KO2 is calculated based on the output SVO2 of the downstream O2 sensor 29 to carry out the feed back control of the air-fuel ratio. The process for calculating the KO2 will first be described with reference to FIG. 5 and FIG. 6.

Figure 5:
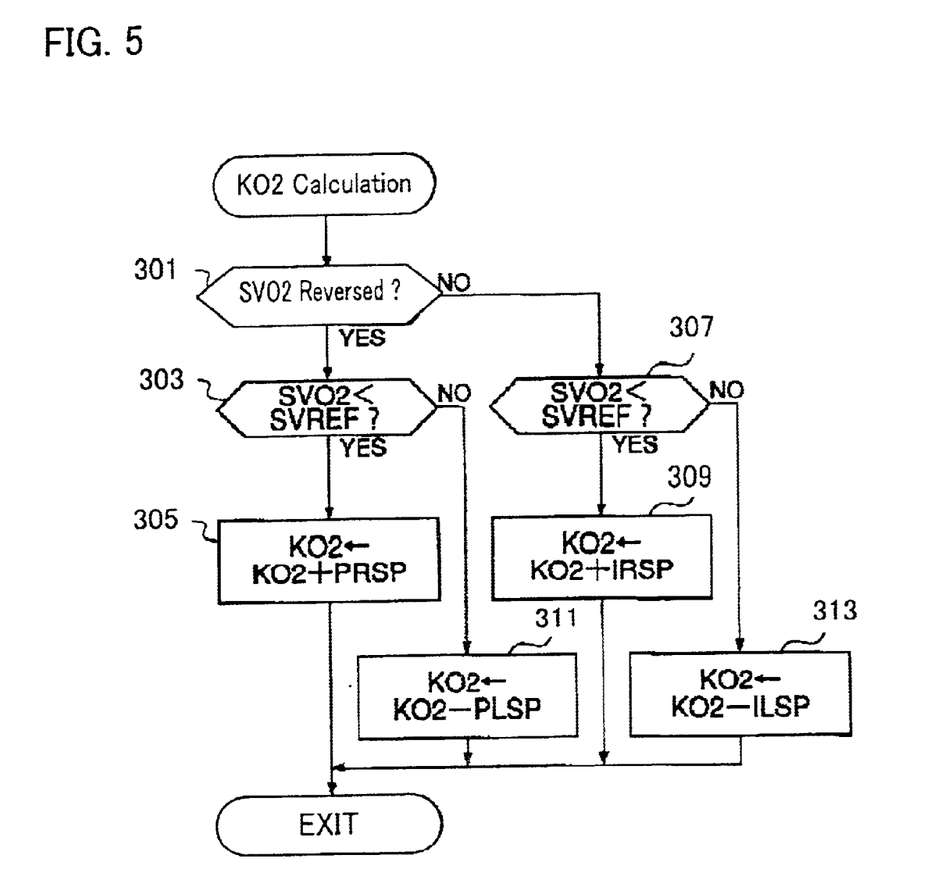
FIG. 5 is a flowchart showing a KO2 calculation process.
Figure 6:
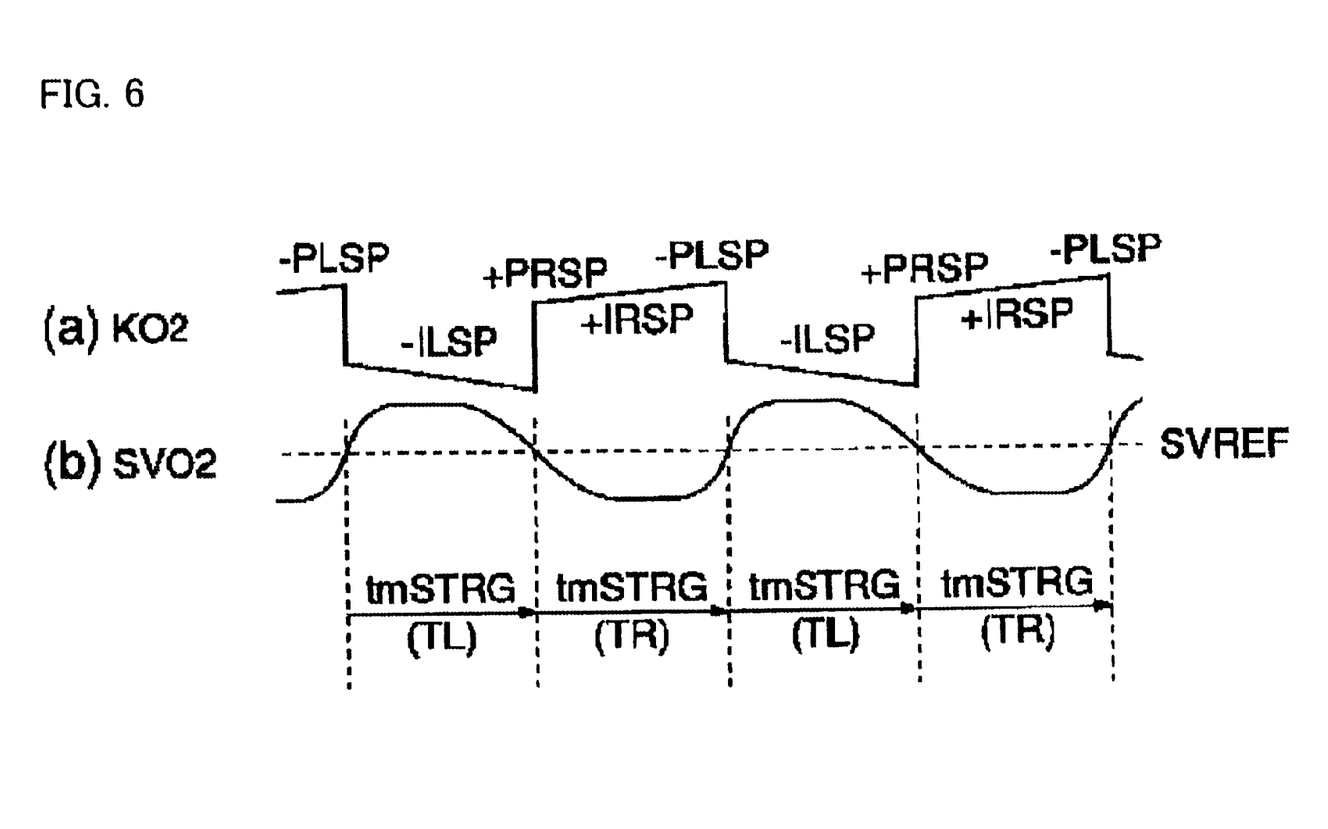
FIG. 6 shows feedback control of air-fuel ratio.

FIG. 5 illustrates a flowchart for the KO2 calculation process, and FIG. 6 illustrates a feedback control of the air-fuel ratio. FIG. 6 (a) shows the air-fuel ratio correction coefficient KO2 during the feedback control. The air-fuel ratio correction coefficient KO2 is a coefficient for obtaining the fuel injection time TOUT of the fuel injector 5, which is in synchronization with the TDC signal pulse. FIG. 6 (b) shows the output SVO2 of the downstream O2 sensor 29, which corresponds to (a) in FIG. 6.

In (b) of FIG. 6, an instance in which the voltage of the output SVO2 is larger than a reference voltage SVREF is referred to as a rich state, and the duration during which feedback control of the air-fuel ratio is performed toward a lean state is referred to as "TL". Another instance in which the voltage of the output SVO2 is smaller than a reference voltage SVREF is referred to as a lean state, and the duration during which feedback control of the air-fuel ratio is performed toward to the rich state is referred to as "TR".

In step 301 in the KO2 calculation process in FIG. 5, it is determined whether the output SVO2 has reversed. When it is determined in step 301 that the output SVO2 has reversed, the output SVO2 and the reference voltage SVREF are compared to determine to which side the output SVO2 has reversed in step 303. In other words, if SVO2<SVREF, it means that the reversal is toward the TR side, and if SVO2>SVREF, it means the reversal is toward the TL side.

When the reversal toward the TR side is determined in step 303, the process goes to step 305, where a rich side special P term PRSP is added to the value of the current correction coefficient KO2, so that the correction coefficient KO2 is increased. When it is determined in step 303 that the output SVO2 has reversed toward the TL side, the process goes to step 311, where a lean side special P term PLSP is subtracted from the value of the current correction coefficient KO2, so that the correction coefficient KO2 is decreased.

When it is determined in step 301 that no reversal of the output SVO2 has taken place, the process goes to step 307, where the output SVO2 and the reference voltage SVREF are compared to determine on which side the output SVO2 remains. If it is determined in step 307 that the output SVO2 has reversed toward the TR side, the process goes to step 309, where a rich side special I term IRSP is added to the value of the current correction coefficient KO2, so that the correction coefficient KO2 is increased. If it is determined in step 307 that the output SVO2 has reversed toward the TL side, the process goes to step 313, where a lean side special I term ILSP is subtracted from the value of the current correction coefficient KO2, so that the correction coefficient KO2 is decreased.

Through the above-mentioned feedback control of the air-fuel ratio correction coefficient KO2 based on the output SVO2 of the downstream O2 sensor, the output SVO2 of the downstream O2 sensor will change periodically as shown in FIG. 6. In this specification, such periodical change of the output SVO2 is referred to as "SVO2 period" or "reversal period". More specifically, a sum of a time TL and a TR shown in FIG. 6 is referred to as "one reversal period".

As shown in FIG. 6, the feedback control for determining the catalyst deterioration is performed only based on the output SVO2 of the downstream O2 sensor 29, and the deterioration determination for each catalyst is performed based on the time TL and the time TR. Detailed description follows about the measurement of the SVO2 period with reference to FIG. 4.

In the process for measuring the SVO2 period, a plurality of pieces of TR time and TL time over a plurality of periods are measured in order to improve the measurement accuracy. The number of TR and TL pieces to be measured is predetermined as a measurement count parameter NTLMT that is to be used in step 117. The SVO2 period measurement routine shown in FIG. 4 measures reversal periods as many times as defined by the NTLMT. In this specification, an accumulation value of the time TL is referred to as "TLSUM", and an accumulation value of the time TR is referred to as "TRSUM". Although the value of NTLMT may be 1, the measurements are preferably carried out many times (for example 4 times) according to the desired accuracy.

First, it is checked in step 201 in FIG. 4 whether an initialization flag F_INITIAL is 1. As for this initialization flag, when the SVO2 period measurement routine is executed at the first time, F_INITIAL=0. For the subsequent executions, F_INITIAL=1. Therefore, if F_INITIAL=0, all parameters are initialized in step 205. The parameters to be initialized in step 205 are a counter nT which counts the number of times for the period measurements, an accumulation value TLSUM for the time TL and an accumulation value TRSUM for the time TR. These parameters are all set to a value of 0 in this step 205.

Then, in step 209, the initialization flag F_INITIAL is set to 1, indicating that the initialization has been completed. Besides, a measurement start flag F_CATMON is set to 0 in step 209. This measurement start flag is to indicate that the SVO2 period measurement has started. F_CATMON=1 indicates that the measurement has started, and F_CATMON=0 indicates that the measurement has not started yet.

Consequently, at the first execution time for the SVO2 period measurement, only the initialization steps for the parameters and the flags are performed and then the measurement process returns to step 117 in FIG. 3 for the catalyst deterioration determination process. In step 117, it is determined whether the period measurement counter nT exceeds the predetermined measurement count (NTLMT). Since nT=0 as initialized by the SVO2 period measurement process just after the first execution of the SVO2 period measurement, the first process of the catalyst deterioration determination ends here because nT<NTLMT.

When the process for determining catalyst deterioration starts again, only the upstream catalyst 23 is active. Therefore, the process in step 115 will be explained here assuming step 101 through step 109 have been followed. In this process cycle, the SVO2 period measurement process of step 115 proceeds to step 203 because the initialization flag F_INITIAL has already been set to 1 in the previous step 209.

In step 203, it is determined whether or not the output SVO2 has reversed. When the output SVO2 has not reversed, this process ends and returns to the catalyst deterioration determination process, where the same process as aforementioned will be repeated. When the output SVO2 has reversed, the process goes to step 207.

In step 207, the value of the measurement start flag F_CATMON is verified to determine whether the SVO2 period measurement has started. Because the value of F_CATMON has been previously set to 0 during the initialization in step 209 as aforementioned, the process at the first execution in step 207 should go to step 213. Namely, if F_CATMON=0, which indicates the measurement has not started yet, then the process proceeds to step 213, where F_CATMON is set to 1 to indicate that the SVO2 period measurement has started.

Additionally, in step 213, a measurement management flag F_CATMEAS is set to 0. This F_CATMEAS is used to make the final counted number of times for both TRSUM and TLSUM equal. This flag allows for the SVO2 measurement process to be started with either TL side or TR side.

In step 225 after step 213, a timer tmSTRG is cleared. Then, the process for the SVO2 period measurement ends and returns to the catalyst deterioration determination process, where the same processes as aforementioned will be repeated.

When it is determined in step 207 according to the value of the measurement start flag F_CATMON that the SVO2 period measurement has started, the process goes to step 211, where the output SVO2 and the reference voltage SVREF are compared to determine on which side the current output SVO2 exists.

When SVO2<SVREF in step 211, the process goes to step 215, where the value of the timer tmSTRG is added to the previous value of the TRSUM. On the other hand, when it is determined in step 211 that SVO2≧SVREF, the process goes to step 217, where the value of the timer tmSTRG is added to the previous value of the TLSUM.

In step 219 after addition of tmSTRG in step 215 or step 217, the value of the measurement management flag F_CATMEAS is verified. When F_CATMEAS=0, the process proceeds to step 223, where F_CATMEAS is set to 1. When F_CATMEAS=1, the process proceeds to step 221, where the value of the current period measurement counter nT is incremented by 1 and F_CATMEAS is set to 0 (zero). In step 225 after step 221 or step 223, Timer tmSTRG is cleared.

As regards the process from step 203 through step 225, when it is determined in step 203 that SVO2 has reversed, timer tmSTRG is cleared and the process for measuring the SVO2 period for the first time is finished. When the process comes to step 203 again in the next process cycle, if it is determined that SVO2 has not reversed, the timer tmSTRG keeps running. In the subsequent process cycles for SVO2 period measurement, the timer tmSTRG keeps running as long as the reversal of the SVO2 does not take place.

However, once the SVO2 has reversed in any process cycle of the SVO2 period measurement after step 203 for the first time, the process proceeds to either 215 or step 217 through 211, so that the current value of the timer tmSTRG is added to TRSUM or TLSUM. Since tmSTRG is cleared in step 225 after the addition operation in step 215 or step 217, the value of tmSTRG that is to be added in step 215 or step 217 always represents one time interval (either TL or TR) from an reversal of the SVO2 to the next reversal as shown in FIG. 6.

The value of the measurement management flag F_CATMEAS is changed every time the process proceeds from step 219 through step 225, whereas the value of the period measurement counter nT is incremented only when F_CATMEAS=1. Accordingly, nT is counted every time the output SVO2 has elapsed one period. Because the value of F_CATMEAS is initially set to 0(zero) and the value of the period measurement counter nT is compared with the measurement frequency parameter NTLMT in step 117 of FIG. 3, both TRSUM and TLSUM used in step 119 of FIG. 3 are always the results of the addition operations performed the same number of times respectively.

Thus, in the process of the SVO2 period measurement, nT number of time TR and time TL over nT periods are measured. As a result, the accumulated value for each of TL and TR (TLSUM and TRSUM) for the nT number of times is obtained. The obtained TLSUM and TRSUM are used to further obtain a parameter representing the oxygen storage capacity of each catalyst. Detailed description will follow about the catalyst deterioration determination process assuming that the period measurement counter nT has reached the predetermined number of times NTLMT in step 117, FIG. 3 and the accumulated values of TL and TR for the nT number of times have been obtained respectively.

When the period measurement counter nT has reached the predetermined number of times NTLMT in step 117, the catalyst deterioration determination process goes to step 119.

In step 119, a checking time TCHK is calculated according to equation (1) as shown below. The checking time TCHK is the average of SVO2 period over NTLMT times of measurement of the SVO2 periods. Through the use of the average value, accuracy of the measurement for the oxygen storage capability of the catalyst will be enhanced.

$$TCHK = (TLSUM + TRSUM)/nT \quad (1)$$

In step 121, the value of the catalyst identification flag F_CAT2JUD is verified to determine on which catalyst the deterioration determination is being performed. In case of F_CAT2JUD=0, the process goes to step 127 because the deterioration determination is being performed upon the upstream catalyst 23. In case of F_CAT2JUD=1, the process goes to step 123 because the deterioration determination is being processed upon the downstream catalyst 25. Description will first be made for the case where the process proceeds to step 127 assuming that the deterioration determination is being performed upon the upstream catalyst 23.

In step 127, a first determination parameter OSCINDEX1 representing the oxygen storage capacity of the upstream catalyst 23 is calculated based on the following equation (2):

$$OSCINDEX1 = TCHK \times GAIRSUM \quad (2)$$

where GAIRSUM is a parameter representing the accumulated value of the exhaust gas flow during the SVO2 period measurements over nT number of times. This parameter will be referred to as "accumulated value of airflow" hereinafter in this specification. The determination parameter with consideration about a change in the flow amount of the exhaust gas can be obtained by multiplying the checking time TCHK by the accumulated value of airflow.

Figure 7:
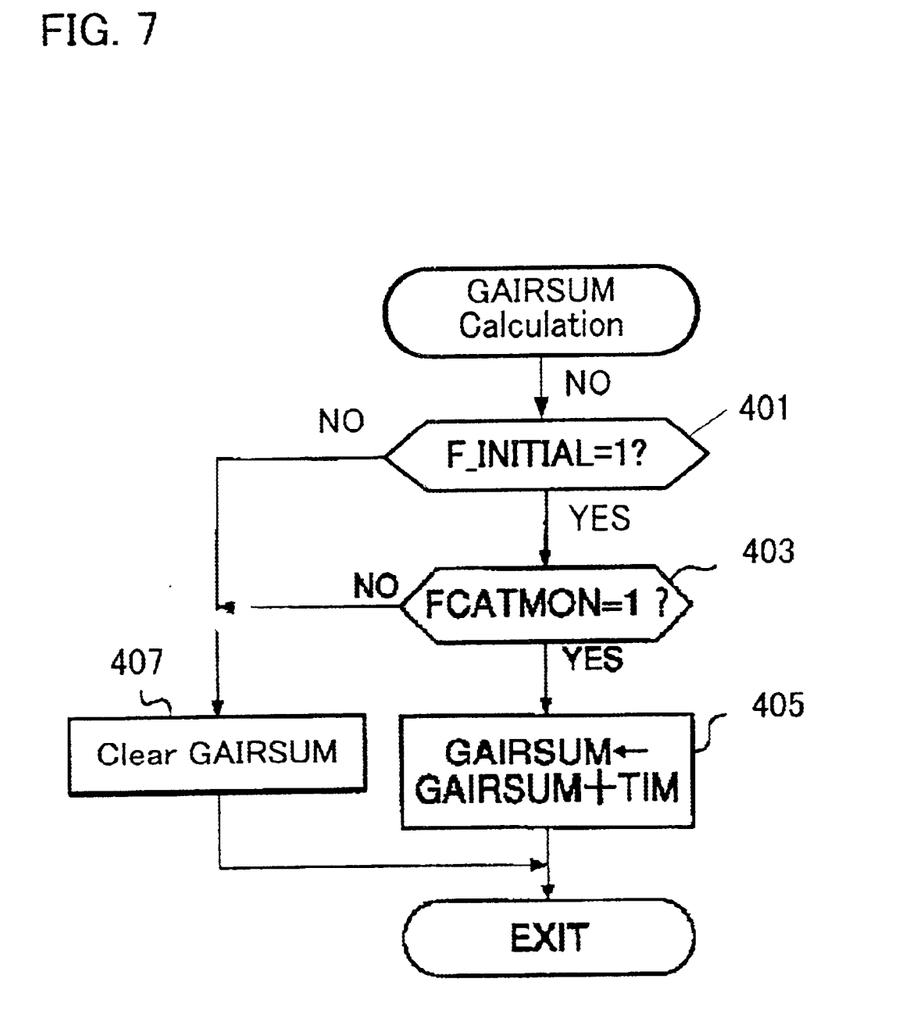
FIG. 7 is a flowchart showing a process for obtaining the accumulated value of airflow.

FIG. 7 shows a process for obtaining the accumulated value of airflow GAIRSUM. This process is carried out for every occurrence of the TDC signal pulse that is output in response to rotation of the crankshaft.

At first, in step 401, it is verified whether the initialization flag F_INITIAL is 1 or not. As for this initialization flag F_INITIAL, when the routine of the SVO2 period measurement is to be executed for the first time, F_INITIAL=0, and for the subsequent process cycles, F_INITIAL=1. Therefore, when F_INITIAL=0 in step 401, the process proceeds to step 407, where GAIRSUM is cleared in the same manner as for the initialization in the SVO2 period measurement, and the process ends.

When the accumulated value of airflow GAIRSUM has already been cleared and F_INITIAL is set to 1, the process proceeds to step 403, where the measurement start flag F_CATMON of the SVO2 period is verified. When FCATMON=0 indicating the SVO2 period measurement has not started yet, the accumulated value of airflow GAIRSUM is cleared and the process ends. When FCATMON=1, the process goes to step 405, where a base fuel quantity TIM is added to the current accumulated value of airflow GAIRSUM according to the following equation (3):

$$GAIRSUM = GAIRSUM + TIM \quad (3)$$

The base fuel quantity TIM included in equation (3) specifically represents a base fuel injection time that is set such that the air-fuel ratio of the air-fuel mixture supplied to the engine could be almost equal to the theoretical air-fuel ratio. The base fuel quantity TIM is set depending on the engine revolving speed Ne and the absolute pressure PBA inside of the intake manifold. Accordingly, the base fuel quantity TIM carries a value which is in proportion to the air intake amount. Because the air intake amount is almost equal to the exhaust gas flow rate, the base fuel quantity TIM is used in this embodiment as a parameter for representing the exhaust gas flow rate. Thus, a parameter that is equivalent to the accumulation value of the exhaust gas flow rate could be obtained without providing an air intake sensor or an exhaust gas flow amount sensor.

In step 127 for the catalyst deterioration determination process, the checking time TCHK is multiplied by such obtained accumulated value of airflow during the SVO2 period measurement process, so that the first determination parameter OSCINDEX1 that represents the oxygen storage capacity of the upstream catalyst 23 can be calculated. This OSCINDEX1 represents the oxygen storage capacity of the upstream catalyst 23 with consideration of the change in the exhaust gas flow rate.

Next, in step 129, it is determined whether the first determination parameter OSCINDEX1 exceeds a first determination reference value LMTDC1 in step 129. This first determination reference value LMTDC1 is a predetermined criteria value for the oxygen storage capacity of the upstream catalyst 23. When the first determination parameter is less than the criteria value, it is determined in step 133 that the upstream catalyst 23 has deteriorated. When the first determination parameter is no less than the first reference value, the process for the catalyst deterioration determination goes to step 135, where it is determined that the upstream catalyst 23 is normal.

After the deterioration determination for the upstream catalyst 23 has been performed in step 133 or step 135, the process for the catalyst deterioration determination proceeds to step 141, where the determination completion flag F_DONE for the upstream catalyst 23 is set to 1 in order to indicate that the deterioration determination of the upstream catalyst 23 has been completed. Besides, in step 141, the initialization flag F_INITIAL is set to 0 for preparing the process for the deterioration determination for the downstream catalyst 25. At this time point, the process for the deterioration determination in relation with the upstream catalyst 23 has been completed.

Secondly, the deterioration determination process for the downstream catalyst 25 will be described in detail. In case of the deterioration determination process for the downstream catalyst 25, the measurement is performed during the time region C shown in FIG. 2. In other words, when the temperature TCAT1 of the upstream catalyst 23 is within the range of 300 to 800° C. in terms of the catalytic activation temperature and when the temperature TCAT2 of the downstream catalyst 25 is also within the range of 300 to 800° C. in terms of the catalytic activation temperature, the deterioration determination process for the downstream catalyst 25 is carried out. Therefore, the process for the catalyst deterioration determination proceeds to step 111 after step 107.

In step 111, the determination completion flag F_DONE for the upstream catalyst 23 is verified. When F_DONE is set to 1, which indicates that the deterioration determination for the upstream catalyst 23 has already been completed, the process goes to step 113, where the catalyst identification flag F_CAT2JUD is set to 1 to indicate that the deterioration determination process for the downstream catalyst 25 is underway. When F_DONE is 0 in step 111, which indicates that the deterioration determination for the upstream catalyst 23 has not been completed yet, the deterioration determination process ends here.

Subsequently, in step 115, the SVO2 period for the downstream O2 sensor 29 is measured. This period measurement process is performed in the same manner as aforementioned. However, since both upstream catalyst 23 and the downstream catalyst 25 are activated in this instance, the output of the downstream O2 sensor 29 detected here is the overall oxygen density which have been influenced by both the upstream catalyst 23 and the downstream catalyst 25. In other words, the accumulated value TLSUM and the accumulated value TRSUM that are obtained as a result of the SVO2 period measurement represent the overall oxygen storage capacity for both catalysts (the upstream catalyst 23 and the downstream catalyst 25).

When the period measurement counter nT reaches a predetermined measurement number of times NTLMT in step 117, namely, when the TLSUM and the TRSUM have been measured nT number of times, the process for the catalyst deterioration determination proceeds to step 119, where the checking time TCHK is calculated according to equation (1).

In step 121, the value of the catalyst identification flag F_CAT2JUD is verified to determine on which catalyst the deterioration determination process is being performed. In this instance, since the deterioration determination for the upstream catalyst 23 has already been completed and accordingly the F_CAT2JUD is set to 1, the process goes to step 123.

In step 123, the coefficient KCAT1 for correcting the value of the first determination parameter for the upstream catalyst 23 is calculated. This correction coefficient KCAT1 is calculated so as to obtain the second determination parameter representing the oxygen storage capacity of the downstream catalyst 25 as a single unit in the next step 125. For example, the correction coefficient KCAT1 is defined as a function of the first determination parameter.

In step 125, a second determination parameter OSCINDEX2 representing the oxygen storage capacity for the downstream catalyst 23 is calculated based on the following equation (4).

$$OSCINDEX2 = TCHK \times GAIRSUM - OSCINDEX1 \times KCAT1 \quad (4)$$

In equation (4), GAIRSUM is a accumulated value of airflow during the SVO2 period measurement while both catalysts are activated, which is calculated in the same manner as aforementioned. TCHK is a value to be obtained according to the aforementioned equation (1), indicating an average period value calculated based on the SVO2 periods which have been measured NTLMT times while both catalysts are active. OSCINDEX1 is the first determination parameter for the upstream catalyst 23 that has been measured during the activation delay period.

Therefore, OSCINDEX2 is obtained by subtracting the multiplication value with OSCINDEX1 and KCAT1 from the value representing the overall oxygen storage capacity for the both catalysts that have been obtained when both catalysts are active. Because the correction coefficient KCAT1 has been defined so as to allow for such subtracted value to represent the oxygen storage capacity of the downstream catalyst 25 as a single unit, OSCINDEX2 represents the oxygen storage capacity for the downstream catalyst 25 as a single unit.

Then, in step 131, it is determined whether the second determination parameter OSCINDEX2 exceeds a second determination value LMTDC2. This second determination value LMTDC2 is a predetermined criteria value for the oxygen storage capacity of the downstream catalyst 25. It is determined in step 139 that the downstream catalyst 25 is deteriorated when the oxygen storage capacity of the downstream catalyst 25 is less than this criteria value. When the oxygen storage capacity of the downstream catalyst 25 is no less than LMTDC2 in step 131, it is determined in step 137 that the downstream catalyst 25 is normal.

Thus, the catalyst deterioration detection device in accordance with the invention determines the deterioration of the upstream catalyst 23 during the period when only the upstream catalyst 23 is active (during the activation delay period) and then determines the deterioration of the downstream catalyst 25 during the time period when both the upstream catalyst 23 and the downstream catalyst 25 are active, so that the respective deterioration for each of the catalysts can be separately determined.

As above mentioned, in the process for the catalyst deterioration determination in accordance with the invention, the temperatures of the upstream catalyst 23 and the downstream catalyst 25 are detected in step 103, and then the activation delay period is determined based on the temperature of each catalyst in step 105 and step 107. As aforementioned, although the temperature of each catalyst may be detected by using the respective temperature sensors installed separately at each catalyst, the temperature may be estimated based on operational conditions of the engine. A process for calculating the temperature of each catalyst based on operational conditions of the engine will be described with reference to FIG. 8.

Figure 8:
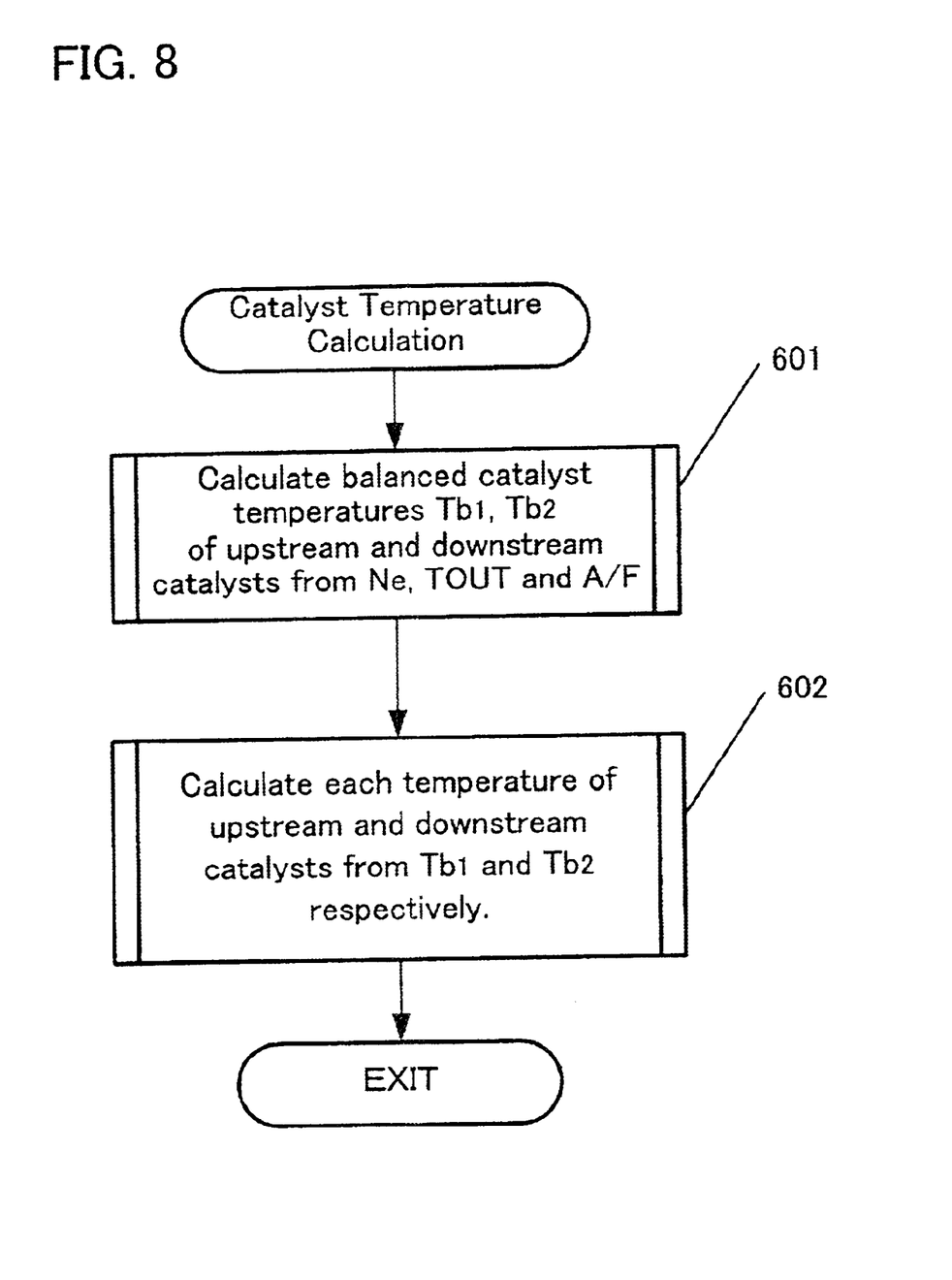
FIG. 8 is a flowchart showing a process for obtaining the temperature of each catalyst according to operational conditions of the engine.

FIG. 8 illustrates a flowchart of a process for obtaining the temperature of each catalyst according to operational conditions of the engine. At first, in step 601, a balanced catalyst temperature Tb1 of the upstream catalyst 23 and a balanced catalyst temperature Tb2 of the downstream catalyst 23 are calculated respectively according to the following equation (5).

$$Tb = K \times (Ne)^a \times (Tout)^b \times \{(A/F)/14.7\} \quad (5)$$

In equation (5), Ne is engine revolution speed, Tout is fuel injection time and A/F is the air-fuel ratio. K, a, b and c are experimentally determined coefficients which have different values respectively in relation with the upstream catalyst 23 and the downstream catalyst 25.

In step 601, the balanced catalyst temperature Tb obtained for each catalyst are averaged based on the following equation (6) to calculate the current catalyst temperature TCAT1n for the upstream catalyst 23 and the current catalyst temperature TCAT2n for the downstream catalyst 23 respectively.

$$TCAT_n = (CREFT/2^{16}) \times Tb + \{1 - (CREFT/2^{16})\} \times TCAT_{n-1} \quad (6)$$

CREFT in equation (6) is a value representing any number from 1 through $2^{16}$ to be used to define a weight between the previously calculated $TCAT_{n-1}$ and the balanced catalyst temperature Tb.

In this way, the temperature of the upstream catalyst 23 and the temperature of the downstream catalyst 25 are calculated based on the operational condition of the engine, so that the aforementioned process for the catalyst deterioration determination could be performed without any additional components such as a temperature sensor.

Although the invention has been described in relation with the specific embodiment, the invention is not limited to such specific embodiment. Various variations that those skilled in the art would make to the above-mentioned embodiment are included in the scope of the invention.

In accordance with invention, in a catalyst converter which disposes two and more catalysts in series, it is possible to detect the activation state of each catalyst so as to determine separately the deterioration for each catalyst by means of sensors placed at two points, that is, at the uppermost side and at the lowermost side.

What is claimed is:

1. A catalyst deterioration detecting system of an internal-combustion engine provided with an upstream catalyst located near the engine upstream of an exhaust system for purifying exhaust gas and a downstream catalyst located separate from the upstream catalyst and substantially far from the engine downstream of the exhaust system for purifying the exhaust gas, said comprising:

an oxygen density detector disposed downstream of the downstream catalyst;

activation detector for determining activation status of each of the upstream and the downstream catalysts; and a deterioration detector for detecting a deterioration degree of the upstream catalyst based on the output of the oxygen density detector;

wherein the deterioration detector is configured to determine the degree of deterioration of the upstream catalyst based on the output of the oxygen density detector when the activation status indicates that the upstream catalyst is active and the downstream catalyst is not active.

2. The catalyst deterioration detecting system according to claim 1, wherein the deterioration detector is configured to detect a deterioration degree of the downstream catalyst based on the previously-detected deterioration degree of the upstream catalyst.

3. The catalyst deterioration detecting system according to claim 1 or claim 2, further comprising activation detector for detecting whether or not each of the upstream and the downstream catalysts is active.

4. The catalyst deterioration detecting system according to claim 3, wherein the activation detector determines activation of each catalyst based on respective temperatures of the upstream and the downstream catalysts.

5. A catalyst deterioration detecting system for determining deterioration of two or more catalysts including an upstream catalyst located at an upstream side of an exhaust system of the internal-combustion engine and a downstream catalyst located at a downstream side of the exhaust system, the catalyst deterioration detecting system comprising:

an oxygen density detector disposed downstream of the downstream catalyst;

activation detector for determining activation status of each of the upstream and the downstream catalysts; and deterioration detector for determining overall deterioration degree of the upstream and the downstream catalysts based on the output of the oxygen density detector, wherein the deterioration detector is configured to determine the degree of deterioration of the upstream catalyst based on the output of the oxygen density detector when the activation status indicates that the upstream catalyst is active and the downstream catalyst is not active.

6. The catalyst deterioration detecting system according to claim 5, wherein the deterioration detector determines the degree of deterioration of the downstream catalyst based on previously-detected deterioration status of the upstream catalyst when the activation status indicates that both the upstream and the downstream catalysts are active.

7. The catalyst deterioration detecting system according to claim 6, wherein the activation detector of the catalyst deterioration detecting system determines activation of each catalyst based on respective temperatures of the upstream and the downstream catalysts.

8. A method for detecting catalyst deterioration of an internal-combustion engine provided with an upstream catalyst located near the engine upstream of an exhaust system for purifying exhaust gas and a downstream catalyst located separate from the upstream catalyst and substantially far from the engine downstream of the exhaust system for purifying the exhaust gas, comprising:

providing an oxygen density detector downstream of the downstream catalyst;

determining activation status of each of the upstream and the downstream catalysts; and detecting deterioration degree of the upstream catalyst based on the detected oxygen density downstream of the downstream catalyst when the activation status indicates that the upstream catalyst is active and the downstream catalyst is not active.

9. The method according to claim 8, wherein the deterioration detector is configured to detect a deterioration degree of the downstream catalyst based on the previously-detected deterioration degree of the upstream catalyst.

10. The method according to claim 8, further comprising detecting whether or not each of the upstream and the downstream catalysts is active.

11. The method according to claim 10, wherein detection of activation of each catalyst is done based on respective temperatures of the upstream and the downstream catalysts.

12. Method for determining deterioration degree of catalysts in an exhaust system of an automobile including at least an upstream catalyst located at an upstream side of the exhaust system and a downstream catalyst located at a downstream side of the exhaust system, the method comprising:

detecting oxygen density at downstream of the downstream catalyst, determining activation status of each of the upstream and the downstream catalysts;

determining overall degree of deterioration of the upstream and the downstream catalysts based on the detected oxygen density at downstream of the downstream catalyst; and determining the degree of deterioration of the upstream catalyst based on the detected oxygen density when the activation status indicates that the upstream catalyst is active and the downstream catalyst is not active.

13. The method according to claim 12, wherein the degree of deterioration of the downstream catalyst is determined based on the previously detected deterioration degree of the upstream catalyst when the activation status indicates that both of the upstream and the downstream catalysts are active.

14. The catalyst deterioration detecting system according to claim 13, wherein activation status of each catalyst is determined based on the temperature of each catalyst.

* * * * *